Jan. 1, 1963     L. H. GOULD     3,071,217
VIBRATION DAMPING IN SHEET METAL STRUCTURES
Filed Jan. 15, 1960

INVENTOR
L. H. GOULD
BY Maybee & Legris
ATTORNEYS

United States Patent Office 3,071,217
Patented Jan. 1, 1963

3,071,217
VIBRATION DAMPING IN SHEET METAL
STRUCTURES
Lawrence Harry Gould, Bay Shore, N.Y., assignor to Avro Aircraft Limited, Malton, Ontario, Canada, a corporation
Filed Jan. 15, 1960, Ser. No. 2,713
8 Claims. (Cl. 189—34)

This invention relates to the damping of vibration in sheet metal structures, and in particular to a method and construction for damping vibration in a sheet metal aircraft fuselage and in similar structures.

The main object of the invention is to provide a structure which will reduce the deleterious affects of structural fatigue by absorbing and dissipating the energy causing vibration in the structure as a result of acoustic excitation.

Further, it is an object of the invention to reduce the noise radiation from structures and, in the case of aircraft, to allow a considerable weight saving in the amount of cabin soundproofing material which is required.

Other objects and advantages will become apparent as the description proceeds.

In the prior art it is taught that to overcome induced vibration, substantial stiffening of the structure is required. Accordingly the prior art has turned to increased panel thickness and/or closer spacing of longitudinal and transverse bracing members, in order to reduce the amplitude of whatever vibrations may be set up. This method is unsatisfactory because a large amount of structural weight must be added before significant improvements are obtained.

Another method which the prior art has used is the application of pressure-sensitive tape which is self adhesive, the tape being applied to the center portions of sheet metal panels, the said pressure-sensitive tape normally being backed with a metallic foil, the damping being achieved by the flexing of the foil and the adhesive tape. This structure is lighter in weight than the stiffened structure but is still unsatisfactory because the inherent damping properties of the material are only partially utilized. Also the additional mass of material added to the centre of the panel tends to increase the vibration amplitude. Thus the beneficial effects obtained by using this method are limited and relatively small in magnitude.

The present invention overcomes the disadvantages of weight and inefficiency in the prior art to a very marked degree and, in the preferred embodiments, comprises the application to the inner surface of an aircraft fuselage skin of a lamination consisting of an inner skin separated from the outer skin by means of a visco-elastic material which material absorbs the energy causing the vibration in a manner which will be more fully described with reference to the accompanying drawings. In these drawings like reference characters refer to like parts and:

Before going further in the description of the invention it is essential that a clear understanding be had of the term "visco-elastic" which term will be frequently used in the following description and the claims. The accurate definition of such a substance is rather difficult to express and many substances, including some of which the applicant may not be aware, may possess the necessary physical properties to make it suitable for use as a "visco-elastic" material in the environment of the present invention. Commercial products are on the market which serve applicant's purpose very well, one of these commercial products being an acrylic base material manufactured by Minnesota Mining and Manufacturing Company and sold as Minnesota Mining and Manufacturing Product No. 466. A second commercially available product is a silicone base material which is manufactured by the Dow-Corning Company and sold as Dow-Corning DC271.

In general it is essential that a material which would be suitable for use as a visco-elastic material in the present invention should be relatively easy to deform when compared with metallic or other such structural materials and should exhibit both viscous and elastic characteristics. These characteristics should be such that there is a lag between applied load and resulting deformation. For example, if a piece of visco-elastic material were stretched by applying a load and the load were suddenly removed, it would contract gradually, reaching its original length some time after the load had been removed.

With the above description of the physical properties which are necessary, it is believed that anyone attempting to put the present invention into practice would have no difficulty in discovering a suitably material for the purposes of the invention. Accordingly, the term "visco-elastic" will be used henceforth in this specification and in the claims without any further attempt to define the material, it being deemed sufficient for the understanding of the invention that the properties which the material has have been explained and that two examples of a commercial product which possesses these properties have been given.

Figure 1:
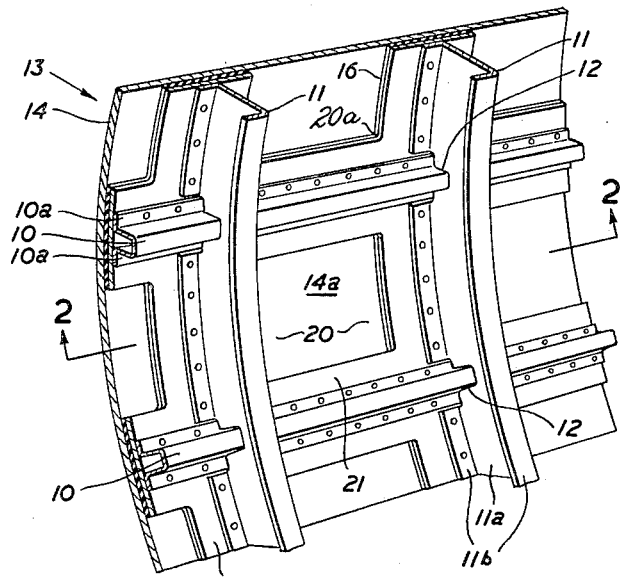
FIGURE 1 is a perspective view of a section of an aircraft fuselage which embodies the present invention viewed from the inside.

Referring now to the drawings, and, in particular, to FIGURE 1 it will be seen that a section of an aircraft fuselage is shown which includes a plurality of longitudinal brace members 10 and a plurality of transverse brace members 11. In the embodiment shown the longitudinal brace members 10 are of "top-hat" construction, that is to say they are provided with a pair of transversely extending flanges 10a and a U-shaped channel member integrally formed with the flanges 10a and extending away from the surface defined by the flanges 10a. The transverse brace members 11 are of C-shaped cross-section and comprise a central web 11a and a pair of flanges 11b both of which extend in the same direction from the web 11a. Each of the transverse brace members 11 is provided with recesses 12 at the points of intersection with the longitudinal brace members 10 so that they may be fitted together with the flanges 10a and one of the flanges 11b lying on a common surface which will be the internal surface of the skin which is to be applied to the skeleton which will be formed by the longitudinal and transverse brace members.

The skeleton formed by the brace members 10 and 11 will be seen to define a plurality of rectangular openings between adjacent longitudinal and transverse brace members.

Although the specific form of skeleton illustrated in FIGURE 1 of the drawings has been described in detail it is to be appreciated that alternative forms of skeleton may be employed without departing from the spirit of the present invention. Clearly, alternative structures are well known in the art and may be employed wherever the design of the complete structure dictates a change from the structure illustrated.

Overlying the skeleton formed by the brace members 10 and 11 is a laminated composite skin which is indicated in FIGURE 1 by the reference character 13. The skin comprises, in general, an outer sheet metal skin 14 and an inner sheet metal member or inner skin 15 which is securely bonded to one surface of the outer skin 14 by the medium of an intervening visco-elastic layer indicated in FIGURE 1 by the reference character 16.

Preferably, the inner skin or inner sheet metal member 15 is somewhat thinner than the outer skin 14 although this skin is clearly thick enough to be self supporting and to resist deformation due to vibration. It is also to be emphasized that the outer skin 14 is a continuous outer skin which extends over the outer surface of the skeleton in a substantially unbroken sheet. This is not to say that the outer skin 14 may not be made up of a plurality of sections but if this is the case each of the sections will be secured to each adjacent section so that, in effect an unbroken skin results. Similarly, it is emphasized that the inner skin 15 is co-extensive with the outer skin 14 and extends as an unbroken member underneath each of the longitudinal brace members 10 and each of the transverse brace members 11. In this manner it distinguishes clearly from the prior art wherein a pad or sheet of vibration damping material is applied only to the center of a panel and does not extend completely to the edges of a panel and, additionally, does not extend underneath the brace members to which the skin is secured.

Figure 2:
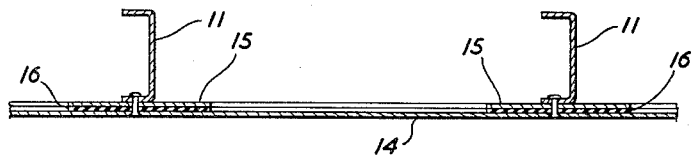
FIGURE 2 is a section view taken along line 2—2 of FIGURE 1.

This construction can be clearly seen from FIGURES 1 and 2 and, in FIGURE 2, the outer skin 14 is shown as extending as an integral sheet over a pair of transverse brace members 11 and the inner skin 15 is shown as extending as an unbroken member beneath the frame members or brace members 11 as does the visco-elastic layer 16 which lies between the inner and outer skins 15 and 14 respectively.

Figure 3:
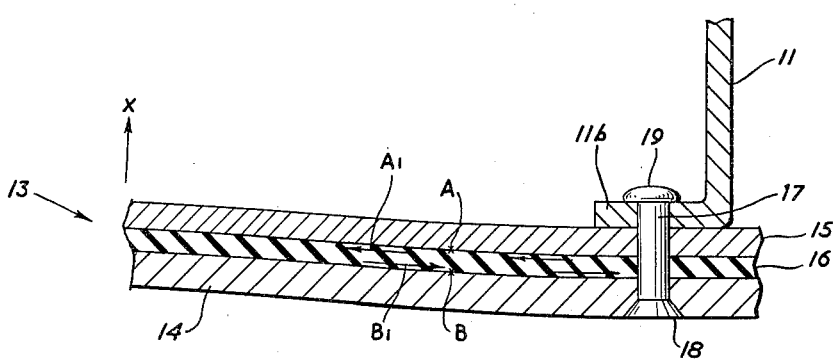
FIGURE 3 is a detail and enlarged view of a portion of the structure shown in FIGURE 2 and illustrating the manner in which the energy is absorbed.

Referring now to FIGURE 3 it can be seen that the transverse brace member 11 is secured, by means of its flange 11b to the composite, laminated skin 13 by means of rivets 17 which, on the external surface of the outer skin 14 are recessed and counter-sunk as at 18 to provide a smooth unbroken surface to promote a smooth flow of air over the external surface of the fuselage. The rivets 17 pass completely through the visco-elastic layer 16 and through the inner sheet metal member or inner skin 15 and is headed over at 19 to rigidly secure the composite laminated skin 13 to the transverse frame 11. It is to be appreciated that the rivets 17 will secure the composite skin 13 not only to the transverse member 11 but also to the longitudinal members 10 and rivet heads are shown at spaced intervals along both members in FIGURE 1, although, in this figure no reference numerals have been applied to them.

In FIGURE 3 the composite sheet metal skin 13 is shown as being deflected from its normal position as a result of vibration which is set up.

For the purposes of understanding the operation of the invention let it be assumed that the composite, laminated skin 13 is moving at the instant of consideration in the direction of arrow X. Due to the bending action illustrated, the upper surface of skin 14 will tend to compress while the lower surface of sheet 15 will tend to stretch. Since both sheets are rigidly clamped by rivet 17, point A on sheet 15 will tend to move in direction A1, and point B on skin 14 in direction B1. As the panel vibrates, this differential motion produces an alternating shear deformation in the visco-elastic layer which causes it to absorb large quantities of the energy producing the vibration, which is then dissipated in the form of heat. This will appreciably reduce the noise which is transmitted through the structure and at the same time increase its fatigue life.

Referring now to FIGURE 1 it will be noticed that the inner sheet metal skin 15 and the visco-elastic layer 16 are cut away over rectangular areas 20 to expose the inner surface 14a of the outer skin 14. The corners of the cut away areas 20 of the inner skin 15 and the visco-elastic layer 16 are rounded as at 20a, to reduce stress concentrations at these points. A marginal band or strip of the inner skin 15 and the visco-elastic layer 16 is left within each of the rectangular openings defined by the longitudinal brace members 10 and the transverse brace members 11 and this marginal band bears reference numeral 21. Accordingly, the central portion of each panel of the outer skin 14 which overlies the rectangular opening in the skeleton is less resistant to vibration than is the marginal band. Accordingly, the center of the panel will deflect and some of the energy causing its deflection will be absorbed by the visco-elastic layer in the shear deformation of the visco-elastic layer as described with reference to FIGURE 3.

The size of the rectangular cutout portion 20 in relation to the overall size of the rectangular panel may vary in accordance with certain circumstances. For example, in the case of an aircraft fuselage it will be possible to determine the amount of energy which will be radiated from such sources as the engines and a percentage of this energy, which percentage is capable of calculation, will cause vibration excitation in the sheet metal skin. Once the amount of energy which will cause vibration has been determined, it can be calculated how much visco-elastic material will be required to absorb the optimum amount of that energy. With the quantity of visco-elastic material thus determined the size of the rectangular cutout can readily be calculated so that the given quantity of visco-elastic material is distributed over the interior surface of the skin in an even layer leaving central rectangular portions bare at the center of each rectangular panel.

Certain variations within this calculated figure can be tolerated and such variations could be based on such factors, for example, as a compromise between optimum damping and a reduction in weight.

Although the invention has been described with reference to a specific preferred embodiment it is to be appreciated that modifications may be made in that embodiment within the spirit of the invention as defined in the appended claims.

What I claim as my invention is:

1. Vibration damping means for a structure including a plurality of longitudinal and transverse brace members in combination with a stressed skin, the brace members dividing one surface of the stressed skin into a plurality of panels; comprising a lamination of a sheet metal member and a visco-elastic layer with the said one surface of the stressed skin, the visco-elastic layer being sandwiched between the sheet metal member and the stressed skin and both the sheet metal member and the visco-elastic layer extending in one integral continuous body beneath the longitudinal and transverse brace members which are secured to the stressed skin by securing means passing through the sheet metal member, the visco-elastic layer and the stressed skin.

2. A vibration resistant structure as claimed in claim 1, in which the inner sheet metal member is thinner than the outer sheet metal member.

3. Vibration damping means for a structure including a plurality of longitudinal and transverse brace members in combination with a stressed skin, the brace members dividing one surface of the stressed skin into a plurality of rectangular panels; comprising a lamination of a sheet metal member and a visco-elastic layer with the said one surface of the stressed skin, the visco-elastic layer being sandwiched between the sheet metal member and the stressed skin and both the sheet metal member and the visco-elastic layer extending continuously beneath the longitudinal and transverse brace members which are secured to the stressed skin by securing means passing through the sheet metal member, the visco-elastic layer and the stressed skin, the sheet metal member and the visco-elastic layer being cut away centrally of each panel to expose the stressed skin on the said one side.

4. Vibration damping means as claimed in claim 3, in which the sheet metal member and the visco-elastic layer are cut away over a rectangular area smaller than the rectangular area of the panel.

5. A vibration resistant structure comprising a plurality of longitudinal and transverse brace members secured to one another to form a skeleton having rectangular openings therein, a laminated stressed skin secured to the skeleton so that to one side of the skin is divided into a plurality of panels by the skeleton, the laminated stressed skin consisting of an outer sheet metal skin, an inner sheet metal skin and a visco-elastic layer between the inner and outer skins, the laminated stressed skin being secured to the skeleton by securing means passing through the outer skin, the visco-elastic layer and the inner skin, and the inner skin and visco-elastic layer being cut away over a rectangular area in the center of each of the panels defined by the skeleton.

6. A vibration resistant structure as claimed in claim 5, in which the rectangular area over which the inner skin and visco-elastic layer are cut away is smaller than the area of the panel defined by the skeleton so that a marginal area of the inner skin and visco-elastic layer remains, surrounding each panel.

7. A vibration resistant structure as claimed in claim 5, in which the corners of the rectangular area over which the inner skin and visco-elastic layer are cut away are rounded to reduce stress concentrations.

8. A vibration resistant structure as claimed in claim 5, in which the inner skin is thinner than the outer skin.

References Cited in the file of this patent

UNITED STATES PATENTS

| 1,738,670 | Rohrbach | Dec. 10, 1929 |
| 2,819,032 | Detrie et al. | Jan. 7, 1958 |
| 2,877,970 | Albertine et al. | Mar. 17, 1959 |

FOREIGN PATENTS

| 508,348 | Great Britain | June 29, 1939 |
| 513,171 | Great Britain | Oct. 5, 1939 |